United States Patent
Walton et al.

(10) Patent No.: US 8,554,943 B1
(45) Date of Patent: Oct. 8, 2013

(54) METHOD AND SYSTEM FOR REDUCING PACKET LATENCY IN NETWORKS WITH BOTH LOW LATENCY AND HIGH BANDWIDTHS REQUIREMENTS

(75) Inventors: John K. Walton, Mendon, MA (US); Kendell Chilton, Southborough, MA (US)

(73) Assignee: EMC Corporation, Hopkinton, MA (US)

( * ) Notice: Subject to any disclaimer, the term of this patent is extended or adjusted under 35 U.S.C. 154(b) by 1080 days.

(21) Appl. No.: 11/278,157

(22) Filed: Mar. 31, 2006

(51) Int. Cl.
- *G06F 15/16* (2006.01)
- *G06F 3/00* (2006.01)
- *H04J 1/16* (2006.01)
- *H04L 12/28* (2006.01)

(52) U.S. Cl.
USPC ......... 709/232; 370/235; 370/395.42; 710/29

(58) Field of Classification Search
USPC .......................... 370/503; 710/113; 709/232
See application file for complete search history.

(56) References Cited

U.S. PATENT DOCUMENTS

| | | | | |
|---|---|---|---|---|
| 4,528,659 A * | 7/1985 | Jones, Jr. | | 370/435 |
| 5,235,593 A * | 8/1993 | Grow et al. | | 370/452 |
| 5,371,733 A * | 12/1994 | Denneau et al. | | 370/241 |
| 5,774,698 A * | 6/1998 | Olnowich | | 712/1 |
| 5,809,258 A * | 9/1998 | Bemanian et al. | | 710/107 |
| 5,896,516 A * | 4/1999 | Powell et al. | | 710/317 |
| 5,914,938 A * | 6/1999 | Brady et al. | | 370/254 |
| 5,922,063 A * | 7/1999 | Olnowich et al. | | 710/317 |
| 5,925,100 A * | 7/1999 | Drewry et al. | | 709/219 |
| 5,926,457 A * | 7/1999 | Feng | | 370/230 |
| 6,026,444 A * | 2/2000 | Quattromani et al. | | 709/232 |
| 6,067,301 A * | 5/2000 | Aatresh | | 370/418 |
| 6,359,882 B1 * | 3/2002 | Robles et al. | | 370/389 |
| 6,504,841 B1 * | 1/2003 | Larson et al. | | 370/386 |
| 6,505,254 B1 * | 1/2003 | Johnson et al. | | 709/239 |
| 6,505,292 B1 * | 1/2003 | Witt | | 712/207 |
| 6,522,629 B1 * | 2/2003 | Anderson, Sr. | | 370/236 |
| 6,546,003 B1 * | 4/2003 | Farris | | 370/352 |
| 6,633,544 B1 * | 10/2003 | Rexford et al. | | 370/238 |
| 6,633,564 B1 * | 10/2003 | Steer et al. | | 370/389 |
| 6,690,668 B1 * | 2/2004 | Szczepanek et al. | | 370/392 |
| 6,731,600 B1 * | 5/2004 | Patel et al. | | 370/230 |

(Continued)

OTHER PUBLICATIONS

Hans Eberle, Nils Gura, Separated High-Bandwidth and Low Latency Communication in the Cluster Interconnect Clint, Sun Microsystems Laboratories.*

*Primary Examiner* — Krisna Lim
*Assistant Examiner* — Margishi Desai
(74) *Attorney, Agent, or Firm* — Krishnendu Gupta; Konrad R. Lee

(57) ABSTRACT

A method and structure for detecting whether the packets received by the switch are low latency packets or high bandwidth packets and routing detected low latency packets to a first one of a pair of switching structures and for high bandwidth packets to a second one of the pair of switching structures. The switch includes an output section for detecting whether a low latency packet is being received during transmission of a high bandwidth packet and, under such detected condition interrupting the transmission of the high bandwidth packet, transmitting the low latency packet, and then transmitting a remaining portion of the high bandwidth packet. The switch inserts delimiters at the start of transmission of the low latency packet and an end of transmission of the low latency packet. The transmission of the low latency packet commences immediately upon detection of such low latency packet.

1 Claim, 5 Drawing Sheets

(56) References Cited

U.S. PATENT DOCUMENTS

| | | | |
|---|---|---|---|
| 6,731,646 B1 * | 5/2004 | Banks et al. | 370/422 |
| 6,754,744 B2 * | 6/2004 | Kim et al. | 710/56 |
| 6,901,074 B1 * | 5/2005 | Yamasaki | 370/400 |
| 6,975,626 B1 * | 12/2005 | Eberle et al. | 370/358 |
| 7,020,166 B2 * | 3/2006 | Chien | 370/528 |
| 7,042,843 B2 * | 5/2006 | Ni | 370/231 |
| 7,061,929 B1 * | 6/2006 | Eberle et al. | 370/423 |
| 7,062,640 B2 * | 6/2006 | Jourdan et al. | 712/238 |
| 7,065,580 B1 * | 6/2006 | Eberle et al. | 709/232 |
| 7,111,163 B1 * | 9/2006 | Haney | 713/153 |
| 7,212,548 B2 * | 5/2007 | Bridges et al. | 370/473 |
| 7,263,587 B1 * | 8/2007 | Yeh et al. | 711/158 |
| 7,295,578 B1 * | 11/2007 | Lyle et al. | 370/503 |
| 7,330,468 B1 * | 2/2008 | Tse-Au | 370/389 |
| 7,372,819 B2 * | 5/2008 | Martin | 370/252 |
| 7,389,357 B2 * | 6/2008 | Duffie et al. | 709/235 |
| 7,460,473 B1 * | 12/2008 | Kodama et al. | 370/230 |
| 7,489,635 B2 * | 2/2009 | Evans et al. | 370/235 |
| 2002/0057708 A1 * | 5/2002 | Galbi et al. | 370/429 |
| 2002/0188732 A1 * | 12/2002 | Buckman et al. | 709/228 |
| 2003/0179755 A1 * | 9/2003 | Fraser | 370/395.42 |
| 2005/0083975 A1 * | 4/2005 | Macri | 370/486 |
| 2006/0029053 A1 * | 2/2006 | Roberts et al. | 370/378 |
| 2006/0067213 A1 * | 3/2006 | Evans et al. | 370/229 |
| 2006/0067362 A1 * | 3/2006 | Ramakrishnan | 370/468 |
| 2006/0200607 A1 * | 9/2006 | Subramaniam Ganasan et al. | 710/113 |
| 2006/0221995 A1 * | 10/2006 | Berkman | 370/463 |
| 2007/0174558 A1 * | 7/2007 | Jia et al. | 711/147 |
| 2007/0195778 A1 * | 8/2007 | Tatar et al. | 370/392 |
| 2009/0043991 A1 * | 2/2009 | Guo et al. | 712/216 |
| 2009/0252134 A1 * | 10/2009 | Schlicht et al. | 370/338 |

* cited by examiner

METHOD AND SYSTEM FOR REDUCING PACKET LATENCY IN NETWORKS WITH BOTH LOW LATENCY AND HIGH BANDWIDTHS REQUIREMENTS

TECHNICAL FIELD

This invention relates generally to packet switching networks and particularly to switches used in such networks.

BACKGROUND

As is known in the art, packet switching networks are used extensively to transmit information from a source node of the network to a destination node of the network. Packets carry the information. A packet switching network utilizes special characters to delimit between packets. Examples of such delimiters are Start of Packet (SOP), End of packet (EOP). Other delimiters may exist to signal an idle state on the network when there are no packets being transferred. Each packet has a source field indicating the address of the source node, a destination field indicating the address of the destination node, a set of other fields that describe characteristics of the packet, and the information field having the information to be transferred. The source and destination address nodes, along with other fields that describe characteristics of the packet in a temporally first section of the packet called the 'header'. Such header may be protected by a Cyclical Redundancy Check (CRC) to ensure the packet description is intact and uncorrupted. The remainder of the packet is data of variable length; such length may be encoded in the header as an enumerated symbol length; and a subsequent CRC or Error Correction Code. The packets are transferred (i.e., routed) through the network between the source node and the destination node through a series of switches. Previous approaches to packet switched networks have treated packets as indivisible, and thus once a long packet occupied an output of a switch, a low latency packet entering the switch would be required to wait until completion of the long packet before the low latency packet could be transferred through the switch. Switches generally contain packet storage buffers to hold packets that are waiting for outputs of the switch to become free. When such packet storage is provided a switch may exhibit a technique called 'store and forward'; wherein each packet is stored completely before being sent to a free output. Such switches may also exhibit a technique called 'cut through'; wherein after reception of the header is complete, and CRC checked, determination of the output may be made and arbitrated for. If such output is free the packet may be immediately forwarded to the output before the end of such packet is completely received. Such switches generally have a maximum packet size that satisfies the application utilizing the network and the storage inside each switch.

As is also known in the art, the network may route different types of packets, such as low latency packets and high bandwidth packets. A low latency packet is a relatively short packet in comparison to the maximum size of the network packets allowed. These short packets represent control information that is used to intercommunicate between nodes. Such packets may have a special field inside the header to indicate that it is a low latency packet. If a packet is labeled low latency then the network may route these with priority over all packets not marked low latency. All other packets are then considered application data and will range from the minimum to the maximum packet size for the network. If a packet is not a low latency packet then it may be considered a high bandwidth packet wherein the total amount of data sent through the network with high bandwidth packets is more important than the latency of such packets; since the application requires maximum bandwidth with respect to latency. Thus, as noted above, previous approaches to packet switched networks have treated packets as indivisible, and thus once a long packet occupied an output of a switch, a low latency packet entering the switch would be required to wait until completion of the long packet before the low latency packet could be transferred through the switch. Thus, as shown in FIG. 1, with a low latency (LL) packet being received at time t during transmission of a high bandwidth packet the LL packet is required wait for complete transmission of the high bandwidth (HB) packet before transmission of the low latency (LL) packet;

SUMMARY

In accordance with the present invention, a switch is provided for routing packets of information. The switch includes a pair of switching structures; one of the pair of switching structures for routing low latency packets and the other one of the pair of switching structures for routing high bandwidth packets.

In one embodiment, the switch includes an output section for detecting whether a low latency packet is being received during transmission of a high bandwidth packet and, under such detected condition interrupting the transmission of the high bandwidth packet, transmitting the low latency packet, and then transmitting a remaining portion of the high bandwidth packet.

In one embodiment, the switch inserts delimiters at the start of transmission of the low latency packet and an end of transmission of the low latency packet.

In one embodiment, the transmission of the low latency packet commences immediately upon detection of such low latency packet.

In one embodiment, the switch includes decode logic inside an input of an input/output (I/O) port of the switch; such logic detecting whether the packets received at such input is a low latency packet or a high bandwidth packet.

In accordance with another feature of the invention, a method is provided for routing packets of information. The method includes detecting whether the packets received by the switch are low latency packets or high bandwidth packets and routing detected low latency packets to a first one of a pair of switching structures and for high bandwidth packets to a second one of the pair of switching structures.

This method ensures that low latency packets are given both the highest priority by allowing the output to supercede the high bandwidth long packets with smaller low latency packets, and to do it on the order of a symbols worth of latency (typically 8 ns or so). This vastly reduces latency for latency sensitive packets.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
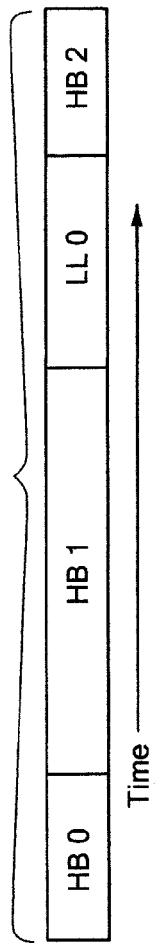
FIG. 1 is a time history showing transmission of low latency (LL) packet and high bandwidth (HB) packet passing through a switch of a packet switching network in accordance with the PRIOR ART, with the low latency packet being received at time t during transmission of a high bandwidth packet and being required wait for complete transmission of the high bandwidth packet before transmission of the low latency packet.
Figure 2:
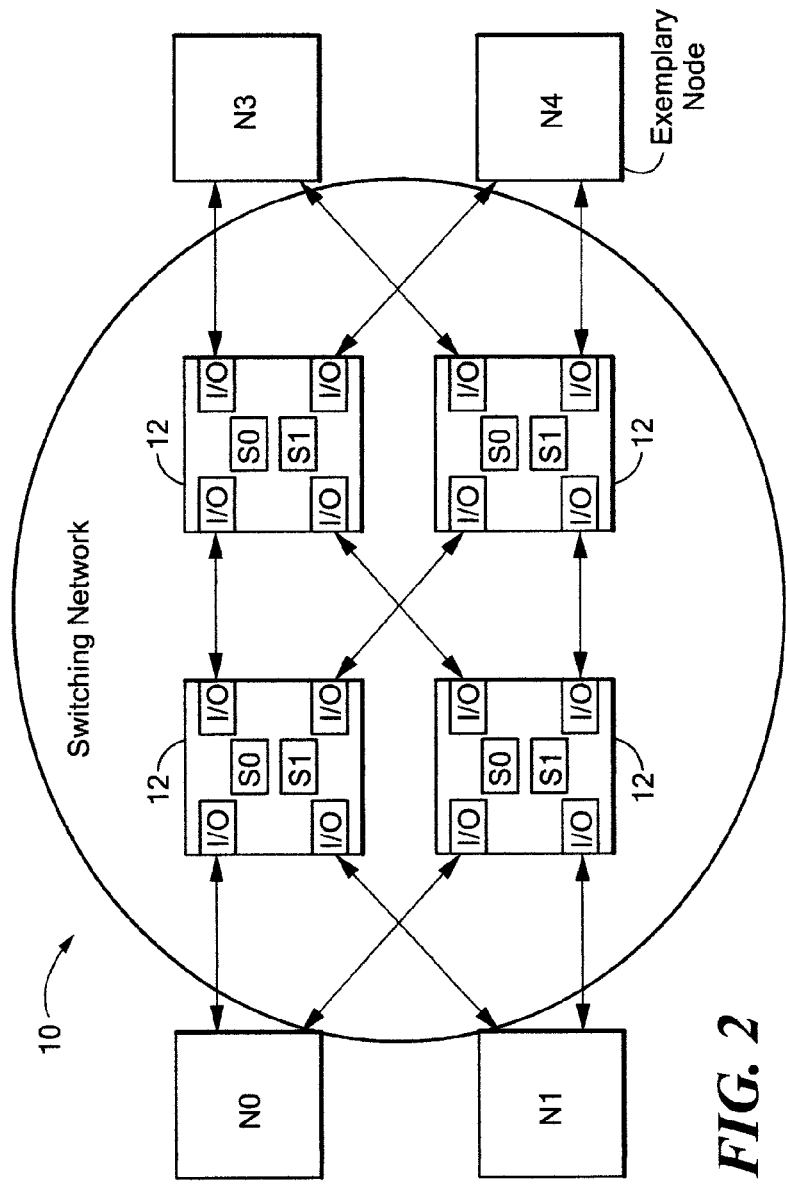
FIG. 2 is a somewhat simplified diagram of a packet switching network according to the invention.

Referring now to FIG. 2, a packet switching network 10 is shown to include a plurality of nodes N0 through N4 interconnected through the network 10. The network 10 includes a plurality of switches 12, here for illustration four switches 12. It should be understood that a network generally would have many more switches than four.

Each one of the switches 12 is here a four input/output (I/O) port switch. An exemplary one of the four I/O ports is shown, and will be described in more detail in connection with, FIG. 3. Suffice it to say here that here the network 10 (FIG. 2) is used in an application where packets being transferred are one of two types: a low latency (LL) packet and a high bandwidth (HB) packet. Thus, two types of packets will go through each one of the switches 12.

Considering an exemplary one of the switches 12, such switch includes a pair of independent switching structures S0, S1; one of the pair of switching structures for routing low latency packets, here switching structures S0 and the other one of the pair of switching structures for high bandwidth packets, here switching structures 51.

Figure 3:
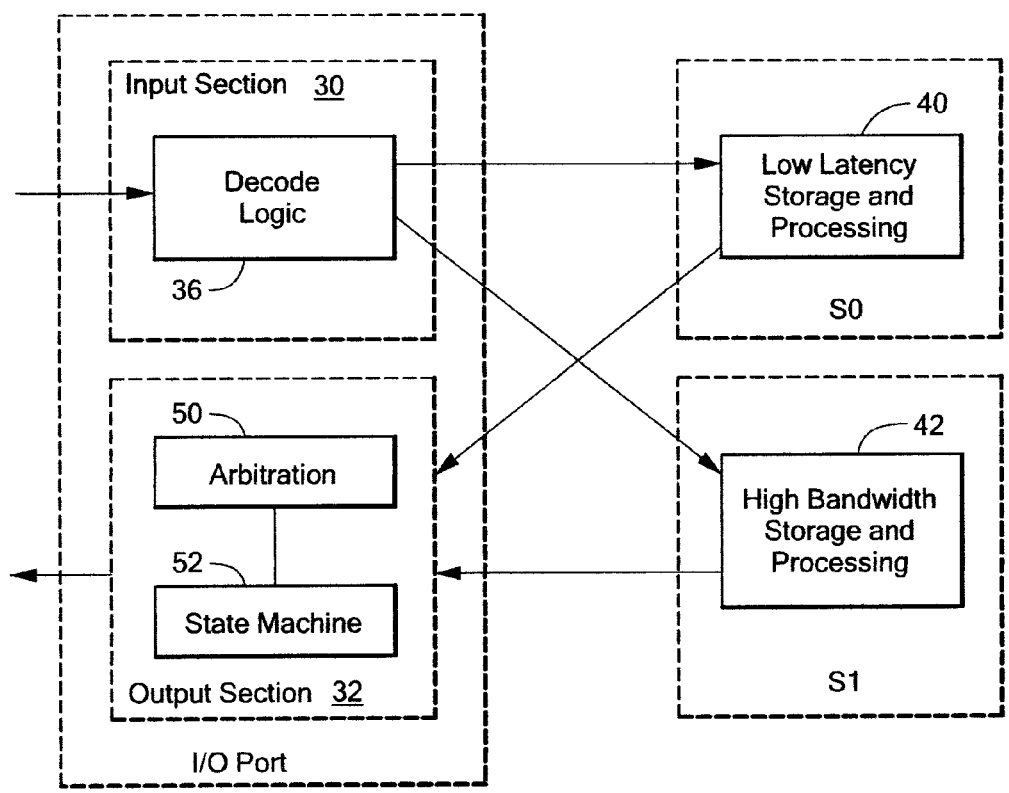
FIG. 3 is a diagram of an exemplary of an input/output (I/O port) of switches used in the network of FIG. 1 in accordance with the invention.
Figure 4:
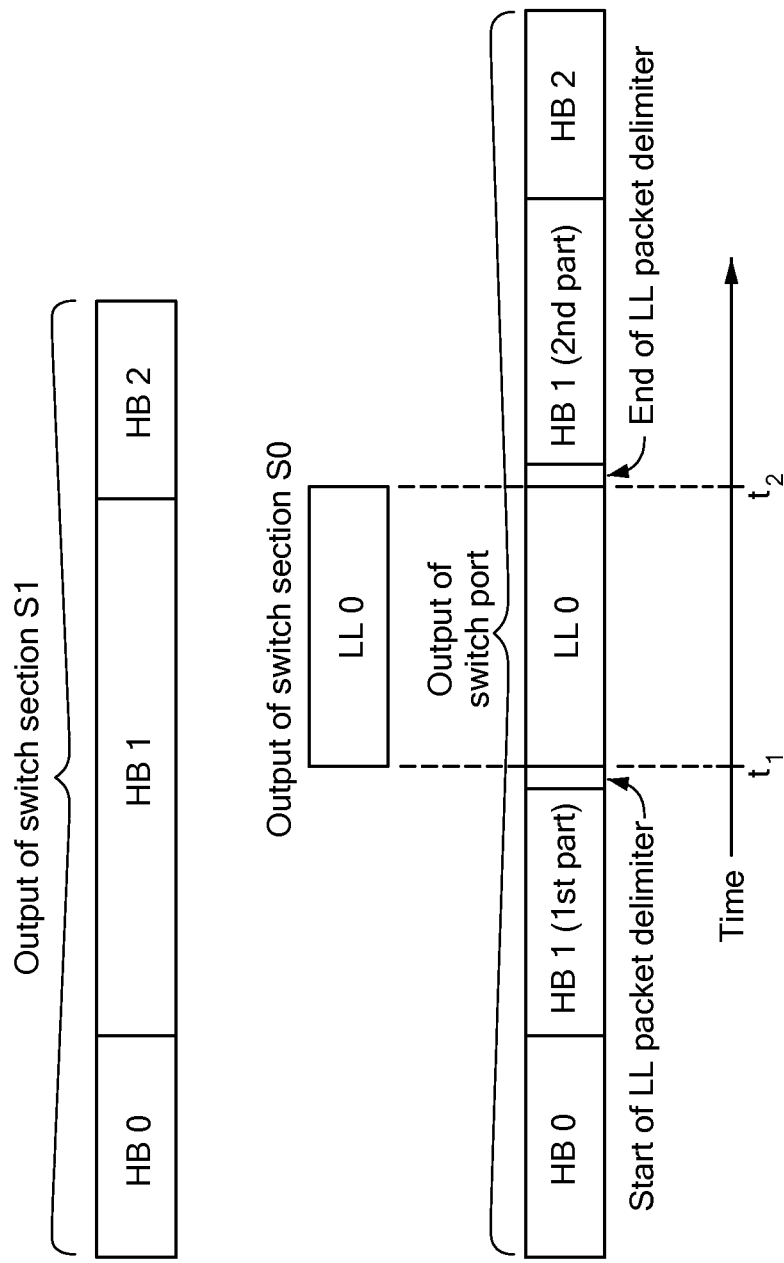
FIG. 4 is a diagram showing packets routed through the switch of FIG. 2 with low latency packets and high bandwidth packets spliced together in accordance with the invention.

Referring now to FIG. 3 an exemplary one of the I/O ports is shown. Each I/O port has an input section 30 and an output 32. The input section includes decode logic 36 for whether the packets received such input is a low latency (LL) packet or a high bandwidth (HB) packet. The decoder section 36 operates in accordance with a process to be described in more detail in connection with FIG. 5. Suffice it to say here that the decode logic 36 detects whether the packet is a low latency packet or a high bandwidth packet, to separate LL packets from HB packets and then routes low latency (LL) packets to a low latency storage and processing section 40 within switching structure S0 and routes HB packets to a high bandwidth storage and processing section 42 within switching structure S1 of the same switch 14, as shown. Both the low latency storage and processing section 40 and the high bandwidth processing section 42 operate independently of each other. The output section 32 of the I/O port includes arbitration logic 50 inside each one output of the I/O ports. The process performed by the output section will be described in more detail in connection with FIG. 6. Suffice it to say here that arbitration logic 50 detects when there is contention between a low latency packet and a high bandwidth packet for the one output of the I/O port. Under such condition, output section operates with the arbitration 50 and a state machine 52 to resolve the contention. As will be described in more detail below, if a low latency packet (LL) is received during transmission of a high bandwidth packet, the transmission of the high bandwidth packet is immediately interrupted, the low latency packet is transmitted and then the remainder of the high bandwidth packet is transmitted as shown in FIG. 4 where the following sequence of packets is received from switching structure S1: HB0, HB1, HB2. In this example, a low latency packet LL0 is received at the output section 32 from switching structure S0 at a time t1 during the transmission of the packet HB1. It is noted that the process immediately interrupts the transmission of packet HB1 and immediately transmits packet LL0. Thus only the first part of packet HB1 has been transmitted before complete transmission of LL0. After complete transmission of LL0, the process completes transmission of HB1, (i.e., the second part of HB1) as indicated in FIG. 4

Note low latency packets will be received from switching structure section S0 and high bandwidth packets will be received from switching structure S1.

More particularly, the state machine 52 inserts delimiters between the packets being coupled to the output of the switch if there is contention between a low latency, and a high bandwidth packet at the output of the I/O port. The state machine 52 interrupts the high bandwidth packet and inserts a 'Start of Low Latency delimiter', as shown at time t1 in FIG. 4. The state machine 52 next sends the entire low latency packet through to the output. Next, the state machine 52 inserts an 'End of Low Latency delimiter' at time t2 as shown in FIG. 4; followed by the remainder of the high bandwidth packet.

More particularly, when an input section 30 of an I/O port (FIG. 3) detects that a packet arrived; the logic decoder 36 therein inspects the packet header, and checks the CRC. The logic decoder 36 examines whether the field in the packet header indicates it is LL or HB. If the packet is LL the logic 36 routes the packet to switching structure S0. If it is HB it is sent to switching structure S1.

At the output section 32, when I/O port determines that LL and HB arriving at the output port do not overlap temporally they are forwarded out of the switch 14. If the LL and HB do arrive temporally overlapping, (i.e., if there is temporal contention between a LL packet and a HB packet) then the output of the I/O port will stop accepting the contents of the HB packet from switching structure S0 and the state machine 52 inserts the 'Start of LL packet' delimiter, as described above in connection with FIG. 4, followed by the LL packet from switching structure S0. Immediately after the transmission of the LL packet is complete; an 'end of LL packet' will be sent to the output. Then the output will resume transferring the previously interrupted HB packet from switching structure S1. It should be noted that the relative interval of time required to transfer a delimiter versus a packet is on the order of 500 times as small, and although the total time to process three packets: HB0, HB1, LL0, HB2 has increased by the negligible time of the two special delimiters, the overall time to transfer packet LL0 has been reduced substantially. Thereby maintaining the same bandwidth throughput (number of HB packets over time) required by the HB packets.

Figure 5:
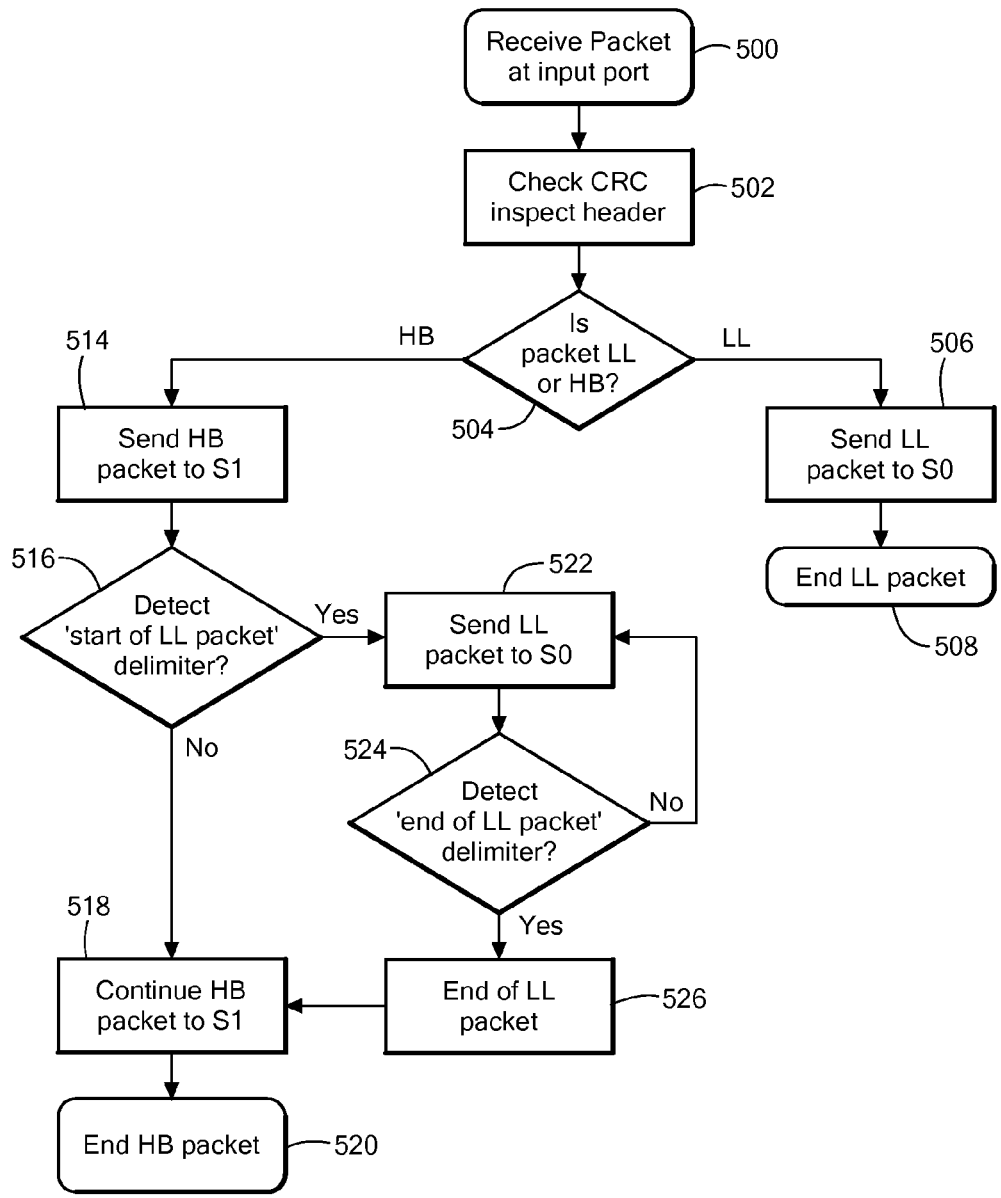
FIG. 5 is a flow diagram of a process used by a decode logic in an input section of an input/output (I/O) port of an exemplary one of the switches shown in FIG. 3.

Still more particularly, the process performed by decode logic 36 (FIG. 3) is shown in FIG. 5. Thus, a packet is received, Step 500. The decode logic 36 check the CRC and inspect header of the received packet, Step 502. If the packet is determined to be a low latency (LL) packet, Step 504, the decode logic 36 send LL packet to the low latency storage and processing section 40 of the switching structures S0, Step 506. Next, the low latency packet is sent, Step 508.

On the other hand, if the packet were a high bandwidth packet the decode logic 36 send the high bandwidth packet to the high bandwidth storage and processing section 42 of the switching structures 51, Step 514. The decode logic 36 then checks for whether there is a 'Start of LL packet delimiter', Step 516. If there is no 'Start of LL packet delimiter' detected in Step 516, the decode logic 36 continues to transmit the high bandwidth packet to switching structure S1, Step 518 and the process for transmission of the high bandwidth packet ends, Step 520.

On the other hand, if in Step 516 Ia 'Start of LL packet delimiter' is detected, the decode logic 36 sends the packet to switching structure So. Step 522. The decode logic 36 next determines if there is an 'end of LL packet delimiter', Step 524. If not, the process returns to Step 522; on the other hand, if there is an 'end of LL packet delimiter' detected in Step 522, the decode logic 32 has finished transmission of the low latency packet and continues with transmission of the high bandwidth packet, Steps 526, 518 and 520.

Figure 6:
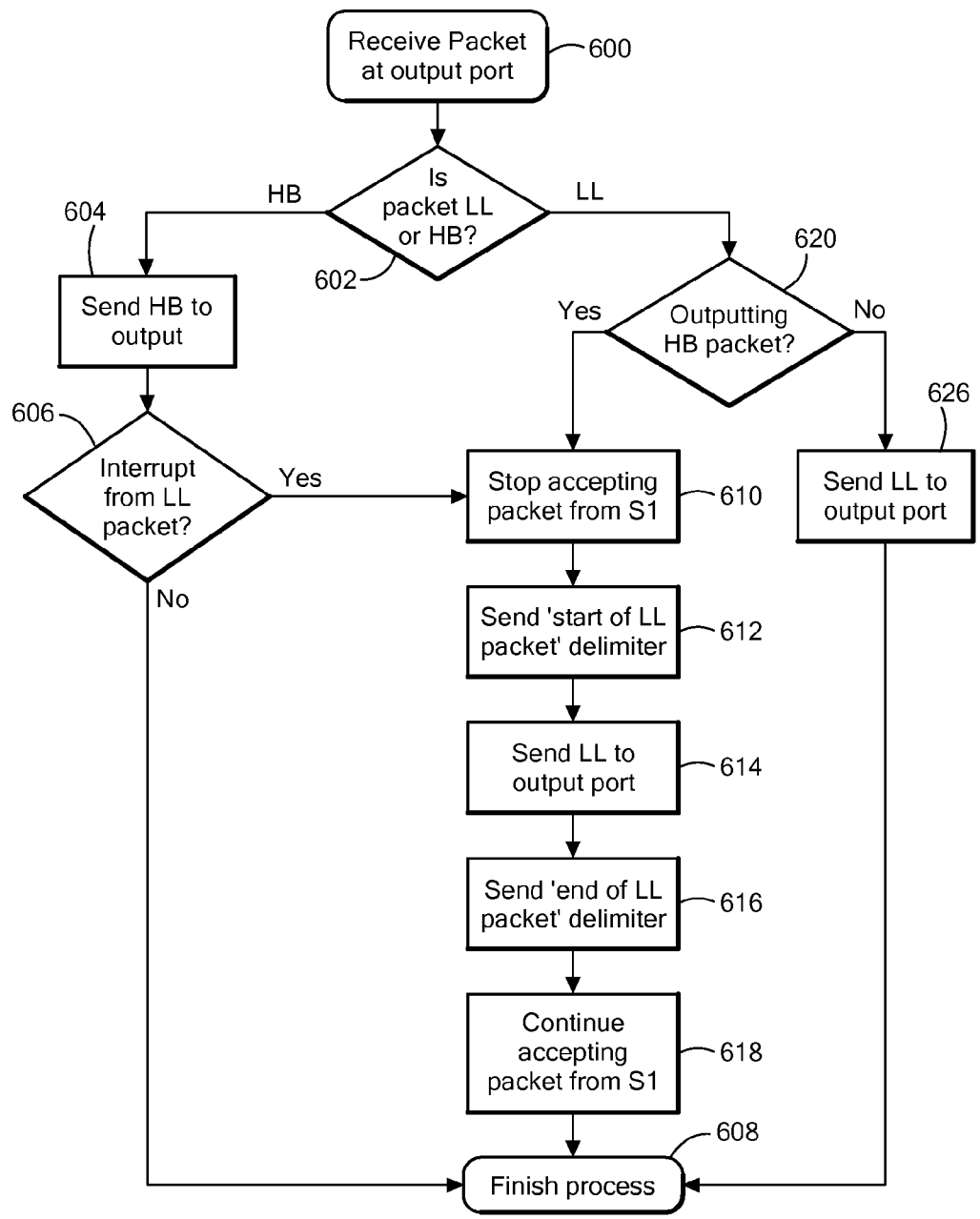
FIG. 6 is a flow diagram of a process used by an output section of an input/output (I/O) port of an exemplary one of the switches shown in FIG. 3.

Referring to FIG. 6, the processing by the output section 32 (FIG. 3) of low latency (LL) and high bandwidth (HB) packets is shown in more detail. Thus, in Step 600 a packet is received. The process determines whether the received packet is a low latency packet or a high bandwidth packet (Step 602). Next, a determination is made as to whether a low latency packet has been received by such received low latency packet generating an interrupt (Step 606). If a low latency packet has not been received, the process finishes transmitting the received high bandwidth packet, Step 608. On the other hand, if in Step 606 a low latency is received during the transmission of the high bandwidth packet, the process immediately stops accepting the high bandwidth packet from S1, Step 610. The process then sends a 'start of low latency packet' delimiter, Step 612, as shown in FIG. 4. The process sends the low latency packet to the output of the switch, Step 614 and then after completion of transmission of the entire low latency packet, sends an 'end of low latency packet' delimiter, Step 616 as shown in FIG. 4. Next, the switch continues to accepts packets from the high bandwidth packet which was interpreted in Step 606, Step 618 and the process is finished, Step 608.

On the other hand, if in Step 602 it was determined that the received packet was a low latency packet, the process determines whether a high bandwidth packet is being transmitted, Step 620 and if so, the processes described for Step 610, 612, 614, 616, 618 and 620 are performed; otherwise, if in Step 620 it was determined that a high bandwidth packet is not being outputted, the process send the received low latency packet, Steps 622 and 608.

A number of embodiments of the invention have been described. Nevertheless, it will be understood that various modifications may be made without departing from the spirit and scope of the invention. Accordingly, other embodiments are within the scope of the following claims.

What is claimed is:

1. A switch, comprising:
(A) a low latency packet processor for processing low latency packets;
(B) a high bandwidth packet processor for processing high bandwidth packets; and
(C) a plurality of input/output sections, each one of the input/output sections comprising:
  (i) an input section, comprising:
    (a) a decode logic for receiving at a common port both low latency packets and high bandwidth packets; and
    (b) wherein the decode logic detects whether each one of the received packets at the common port is a low latency packet or a high bandwidth packet and wherein the decode logic routes the received packets to either the low latency processor or to the high bandwidth processor selectively in accordance with whether the received packet is detected as a low latency packet or a high bandwidth packet; and
  (ii) an output section having a pair of inputs, one of the pair of inputs being coupled to an output of the low latency packet processor and the other one of the pair of inputs being coupled to an output of the high bandwidth packet processor; and
  (iii) wherein the output section:
    (a) interrupts transmission the high bandwidth packets processed by the high bandwidth processor for transmission of the low latency packets processed by the low latency processor;
    (b) inserts a start of low latency packet delimiter;
    (c) transmits the low latency packet:
    (d) inserts an end of low latency packet delimiter;
    (e) and then continues the interrupted transmission of the high bandwidth packet after transmission of the low latency packet to provide at a common output of the output section both the transmitted high bandwidth packets and the transmitted low latency packets.

* * * * *